United States Patent
Griffin et al.

(10) Patent No.: US 9,172,693 B2
(45) Date of Patent: Oct. 27, 2015

(54) QUICK PAYMENT USING MOBILE DEVICE BINDING

(75) Inventors: Kent Griffin, Mountain View, CA (US); Mingzhe Zhu, Bothell, WA (US); Aruna Susarla, Fremont, CA (US); Anshu Gupta, Cupertino, CA (US)

(73) Assignee: PayPal, Inc., San Jose, CA (US)

( * ) Notice: Subject to any disclaimer, the term of this patent is extended or adjusted under 35 U.S.C. 154(b) by 153 days.

(21) Appl. No.: 13/294,923

(22) Filed: Nov. 11, 2011

(65) Prior Publication Data

US 2012/0124676 A1    May 17, 2012

Related U.S. Application Data

(60) Provisional application No. 61/412,730, filed on Nov. 11, 2010.

(51) Int. Cl.

| G06F 7/04 | (2006.01) |
|---|---|
| G06F 15/16 | (2006.01) |
| G06F 17/30 | (2006.01) |
| H04L 29/06 | (2006.01) |
| G06Q 20/36 | (2012.01) |
| G06F 21/41 | (2013.01) |
| G06Q 20/12 | (2012.01) |
| H04W 12/06 | (2009.01) |

(52) U.S. Cl.
CPC ............ *H04L 63/0815* (2013.01); *G06F 21/41* (2013.01); *G06Q 20/12* (2013.01); *G06Q 20/36* (2013.01); *G06Q 20/3674* (2013.01); *H04W 12/06* (2013.01)

(58) Field of Classification Search
CPC ......... G06F 21/04; G06F 21/01; G06F 21/30; G06F 21/41; G06F 21/31; G06F 21/62; H04L 63/0815; H04L 63/08; G06Q 20/10; G06Q 20/102; G06Q 20/12; G06Q 20/14; G06Q 20/3674; H04W 4/001; H04W 12/06
USPC ....................................................... 726/2–8
See application file for complete search history.

(56) References Cited

U.S. PATENT DOCUMENTS

| 8,195,819 | B1 * | 6/2012 | Delker et al. | 709/229 |
|---|---|---|---|---|
| 8,352,323 | B2 * | 1/2013 | Fisher | 705/16 |
| 8,543,496 | B2 * | 9/2013 | Beenau et al. | 705/39 |
| 8,589,237 | B2 * | 11/2013 | Fisher | 705/16 |
| 2002/0188524 | A1 * | 12/2002 | Shimizu | 705/26 |
| 2003/0159072 | A1 * | 8/2003 | Bellinger et al. | 713/202 |
| 2003/0163737 | A1 * | 8/2003 | Roskind | 713/201 |
| 2004/0186901 | A1 | 9/2004 | Guigui | |

(Continued)

OTHER PUBLICATIONS

PCT Search Report and Written Opinion for PCT/US11/60468 dated Mar. 28, 2012.

*Primary Examiner* — Tae Kim
(74) *Attorney, Agent, or Firm* — Haynes and Boone, LLP

(57) ABSTRACT

Methods and systems are provided for secure device binding that provides user convenience through avoiding repetitive logging in when changing apps or moving from website to website. A mobile device undergoes binding to an account so that customers do not always have to enter their password when going through a financial transaction process, on a known (e.g., registered) mobile device. A device may be bound during an initial login, and once logged in, the user can select an option to be "remembered" so that the user need not re-login on the same device for future visits with an app or to a website that shares the service provider library.

17 Claims, 9 Drawing Sheets

(56) References Cited

U.S. PATENT DOCUMENTS

| | | | |
|---|---|---|---|
| 2004/0230831 A1* | 11/2004 | Spelman et al. | 713/201 |
| 2004/0243832 A1* | 12/2004 | Wilf et al. | 713/200 |
| 2005/0039043 A1 | 2/2005 | De Boursetty et al. | |
| 2006/0123472 A1* | 6/2006 | Schmidt et al. | 726/8 |
| 2006/0200425 A1* | 9/2006 | Steele et al. | 705/64 |
| 2006/0218630 A1* | 9/2006 | Pearson et al. | 726/8 |
| 2007/0157298 A1* | 7/2007 | Dingwall et al. | 726/8 |
| 2008/0086759 A1* | 4/2008 | Colson | 726/2 |
| 2009/0144161 A1* | 6/2009 | Fisher | 705/16 |
| 2009/0205016 A1* | 8/2009 | Milas | 726/1 |
| 2009/0319388 A1* | 12/2009 | Yuan et al. | 705/26 |
| 2010/0077469 A1* | 3/2010 | Furman et al. | 726/8 |
| 2011/0092185 A1* | 4/2011 | Garskof | 455/411 |
| 2011/0213671 A1* | 9/2011 | Hirson et al. | 705/16 |
| 2011/0215921 A1* | 9/2011 | Ben Ayed et al. | 340/539.11 |
| 2011/0265149 A1* | 10/2011 | Ganesan | 726/4 |
| 2012/0124651 A1* | 5/2012 | Ganesan et al. | 726/4 |
| 2013/0222116 A1* | 8/2013 | Barry, III | 340/10.1 |

\* cited by examiner

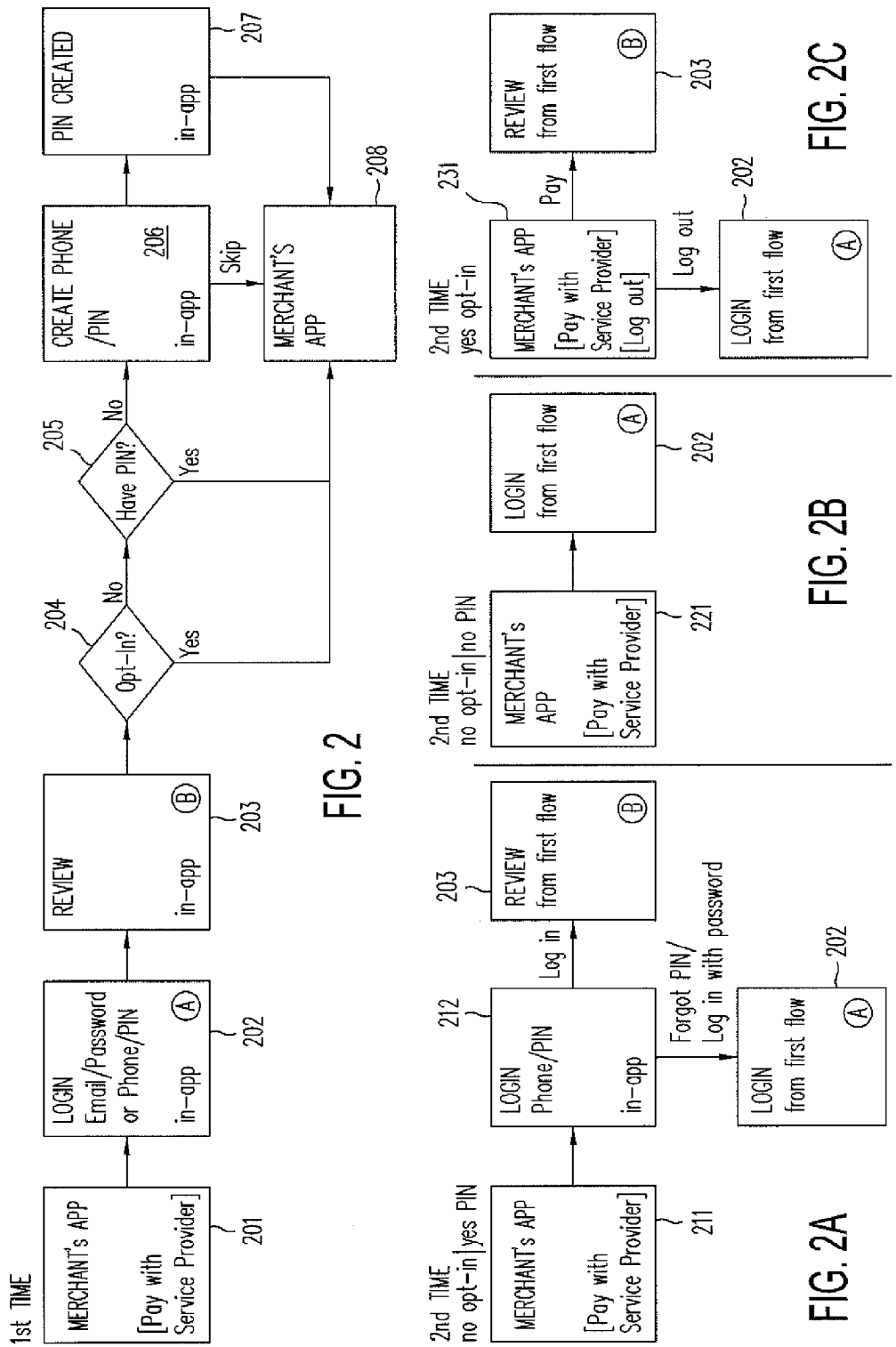

Login page with Remember Me Box.

MPL (Mobile Payment Library) Merchant Page with the user remembered.

QUICK PAYMENT USING MOBILE DEVICE BINDING

CROSS REFERENCE TO RELATED APPLICATIONS

This application claims priority to U.S. Provisional Application No. 61/412,730, filed on Nov. 11, 2010, which is incorporated by reference in its entirety.

BACKGROUND

1. Technical Field

The present disclosure generally relates to electronic commerce conducted over a network using a mobile or other consumer electronic device and, more particularly, to providing a secure device binding that provides user convenience through avoiding repetitive logging in when changing apps or moving from website to website.

2. Related Art

Electronic commerce generally refers to the buying and selling of products or services over electronic networks such as the Internet and other computer networks using electronic devices such as mobile phones with mobile web browsers, smart phones, and electronic note pads. The huge volume of electronic commerce has given rise to a need for the ability to make secure transactions, such as payments for purchases, over the network. There are several service providers that facilitate electronic commerce by providing services to make payments and perform other transactions with security. For example, one service provider describes itself as acting like a digital wallet where the customer can securely store the customer's payment options—such as the customer's bank account and credit card—so that when the customer wants to make a payment, the customer doesn't have to pull out his or her credit card or type his or her billing information every time. This service provider provides a service that can be invoked from a participating merchant's website, for example, by simply clicking on the service provider's checkout button at the merchant website, which redirects the customer to a login page of the service provider where the customer can securely log in to his or her service provider account and select his or her preferred payment method. Then, for example, payment is made to the merchant by the service provider, and the customer is redirected back to the merchant website where the customer may confirm his or her purchase.

SUMMARY

According to one or more embodiments of the present invention, methods and systems are provided for secure device binding that provides user convenience through avoiding repetitive logging in when changing apps or moving from website to website. In one embodiment, a mobile device is bound, or undergoes binding, to an account with a service provider to enable a streamlined authentication flow so that customers do not always have to enter their password when going through a payment flow, or other financial transaction process, on a known mobile device. A device may be bound during an initial login, and once logged in, the user can select an option to be "remembered" for future visits to any app or website that shares the service provider library so that the user need not re-login as long as the user is "remembered". A log in may nevertheless be required, however, in certain situations such as a high dollar amount purchase or a situation with unusual circumstances.

In one or more embodiments, a system includes a processor for communicating over a network with a user device, in which the processor executes a process that binds the user device to a user account so that a secure connection is maintained with the processor when a user switches between a first app on the user device and a second app on the user device or when the user switches between a first website viewed on the user device and a second website viewed on the user device.

In another embodiment, a computer-implemented method includes: communicating over a network with a user device; binding the user device to a user account; and using the binding to maintain a secure connection with the user device when a user switches between a first app on the user device and a second app on the user device or when the user switches between a first website viewed on the user device and a second website viewed on the user device.

In a further embodiment, a computer program product comprises a non-transitory computer readable medium having computer readable and executable code for instructing a processor to perform a method that includes: communicating over a network with a user device; binding the user device to a user account; and using the binding to maintain a secure connection with the user device when a user switches between a first app on the user device and a second app on the user device or when the user switches between a first website viewed on the user device and a second website viewed on the user device.

BRIEF DESCRIPTION OF THE DRAWINGS

FIG. 2 is a process flow diagram illustrating a method for quick payments using mobile device binding in accordance with one or more embodiments;

FIG. 2A, FIG. 2B, and FIG. 2C are conditional portions of the process flow illustrated in FIG. 2, in accordance with one or more embodiments;

DETAILED DESCRIPTION

Figure 1:
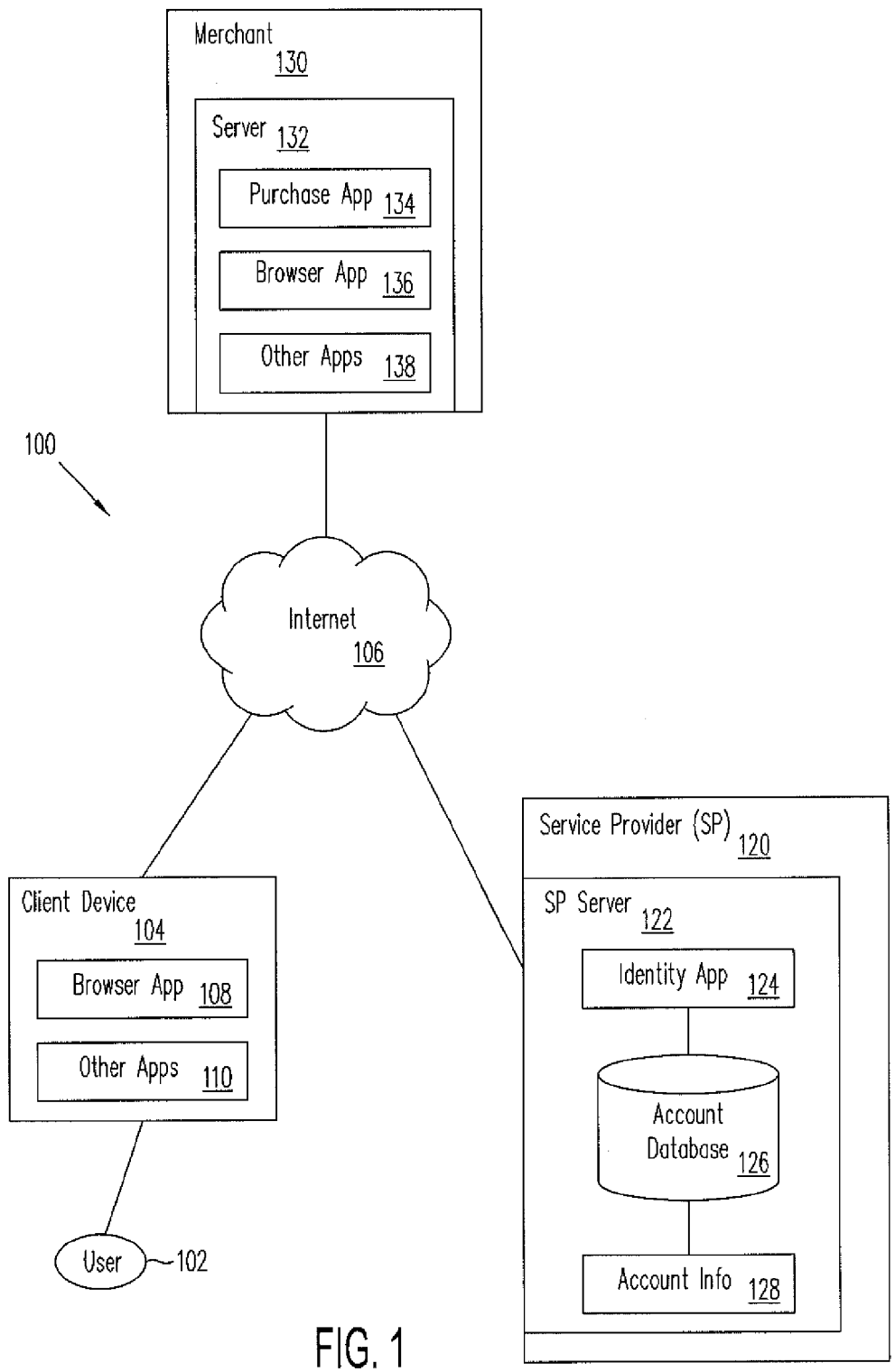
FIG. 1 is a system diagram illustrating a system for conducting transactions using device binding in accordance with one or more embodiments.

According to one or more embodiments of the present invention, methods and systems are provided for secure device binding that provides user convenience through avoiding repetitive logging in when changing apps (application programs) or moving from website to website. In one embodiment, a mobile device is bound, or undergoes binding, to an account—for example, with a service provider, merchant, bank, or other commercial entity—to enable a streamlined authentication flow so that customers do not always have to enter their password when going through a payment flow, or other financial transaction process, on a known mobile device. This device binding can serve as the basis for functionality such as skipping redundant login in various payment flows, risk management processes and models, and other device-based logic. In one embodiment, a device is bound during an initial login, for example, through device interrogation to get a device identification (ID) which may include one or more device identifiers. Once logged in, the user can select an option to be remembered for future visits to any app or website that shares a service provider library. As a result, when the user accesses another app or website through the mobile device, there is no need to go through a login process. A login may be required in certain situations, such as a high dollar amount purchase. A key feature of one embodiment is that it allows the user to bypass login across all apps on the user device that use the service provider library. In addition, the feature can be activated selectively, where a user chooses which apps on the device to stay logged in for. The feature can also be extended to apps from merchants that are not part of the service provider library but do call the library or the service provider to process a purchase request from the user.

Device binding may be based on a unique device identifier which is present on the device (e.g., international mobile equipment (IMEI) number, name of device, various date modified checks, and other variables, or a combination of identifiers). Use of such a device-unique identifier may enable the service provider to remember a user across apps on a device if the user wants to skip subsequent logins on a device. Multiple mobile devices may be bound to a single account. In one embodiment, each mobile device may have only one bound user (e.g., the most recent). The bound user may be able to manage the login preferences of the device. Multiple users will, however, be able to log in on the device, switching who is the most recent and active user and possibly switching who is the bound user. At the service provider back-end (e.g., a database that is automatically maintained by processors of the service provider and connected to network servers) all users of a device may remain associated with that device. In another embodiment, each device can be attached to multiple accounts that share the common device. In these cases, login could be determined based on preferences or other knowledge of which app was being used. For a transition between data models, the service provider can migrate any current conflicts where two users have the same device on their accounts into the new model, such as by running a script to make the bound user the active user or the one who has last used the device.

In one or more embodiments, interoperability with other process flows is possible. In one example, using a mobile web based checkout flow the device binding may occur when the user comes from an app using the service provider library. The mobile web based checkout flow may be used when a web flow is launched or embedded inside an app. The mobile web based checkout flow may represent the payment provider's express checkout flow, but may also be generalized to a web-based flow where pages are rendered via HTML (hypertext markup language). For mobile web based checkout flow, a token may be passed in to the mobile web based checkout flow referencing the device information. For a native library for checkout via mobile apps, the device binding may occur when using the service provider libraries. Generally, the library can do this on behalf of the app developer, whereas with the web flow, information needs to be passed to the web browser to link the two. The app or mobile website can be a shopping or commerce app, P2P (peer-to-peer) money transfer app, or any other type of service that needs to use the login provided by the financial service provider.

FIG. 1 illustrates a system 100, in accordance with one or more embodiments, for making a payment (or other financial transaction needing security) with device binding by a user 102 using a mobile device 104 (also referred to as "user device") to communicate over a network 106 (e.g., the Internet) to a commercial entity (e.g., merchant 130) using a service provider 120. The service provider 120 may be a payment provider or other provider of financial services, such as PayPal, Inc. of San Jose, Calif. Network 106 may be implemented as a single network or a combination of multiple networks. For example, in various embodiments, network 106 may include one or more intranets, landline networks, wireless networks, or other appropriate types of communication networks including the Internet. In another example, the network may comprise a wireless telecommunications network (e.g., cellular phone network) adapted to communicate with other communication networks such as the Internet.

Mobile device 104 may be, for example, a laptop, smart phone, iPad® from Apple, or other mobile computing or communication devices, televisions with internet connection, set-top boxes or other network-connected devices. Mobile device 104, which may function as a client (and may also be referred to as "client device" 104) may be implemented using any appropriate combination of hardware and software configured for wired or wireless communication over network 106. For example, mobile device 104 may be implemented as a personal computer of user 102 (e.g., a client or customer) in communication with network 106. Also for example, mobile device 104 may be implemented as a wireless telephone (e.g., cell phone), personal digital assistant (PDA), or notebook computer.

As seen in FIG. 1, a browser app 108 may run on mobile device 104 and may be used to provide a user interface to permit user 102 to browse information available over network 106. For example, browser app 108 may be implemented as a web browser to view information available over network 106. In one implementation, browser app 108 may comprise a software program such as a graphical user interface (GUI) executable by a processor that is configured to interface and communicate with merchant 130 and service provider 120 via network 106. For example, user 102 may access merchant websites via merchant 130 to find and purchase items. User 102, through client mobile device 104, may also communicate with service provider server 122 to create an account and make a payment to the merchant 130 via service provider 120. Mobile device 104 may include other apps 110 as may be desired to make additional features available to user 102, including making quick payments with service provider server 122. For example, apps 110 may include interfaces and communication protocols that allow the user 102 to receive and transmit information through online sites via network 106. Apps 110 may also include security applications for implementing client-side security features, programmatic client applications for interfacing with appropriate application programming interfaces (APIs) over network 106 and various other types of generally known programs and applications.

Merchant 130 may be a service provider (for example, a merchant site, an auction site, a marketplace, or a social networking site including P2P money transfer or any other P2P-like information transfer) offering various items such as products or services through their website. Merchant 130 (which could be any representative or employee of the merchant) may process online transactions from consumers making purchases through the merchant site from mobile devices. Merchant 130 also may operate a merchant server 132 capable of handling various on-line transactions automatically, for example, by communicating over network 106 with client mobile device 104 and service provider server 122. Merchant server 132 may run a purchase app 134 for offering products or services for purchase. Merchant server 132 may also run a browser app 136 and other applications 138. Browser app 136 and other applications 138 may enable the merchant to access a service provider 120 web site and communicate with service provider server 122; for example, to convey and receive information to allow a quick payment through the service provider 120. In accordance with one or more embodiments, consumers (e.g., user 102) may access apps for making transactions (e.g., payments) with a merchant 130 through a service provider 120) without having to log in, which may enable quicker service (e.g., completing payment processing) with service provider server 132.

Service provider 120 may be an online payments provider, for example, providing processing for online financial and information transactions with a merchant 130 on behalf of a user 102. Service provider server 122 may include one or more identity apps 124, which may be adapted to interact with the client mobile device 104 as well as merchant server 132 over network 106 to facilitate the purchase of items, products, and services by user 102. Service provider server 122 may be configured to maintain multiple user and merchant accounts in an account database 126; each merchant account may include or be separate from account information 128 associated with individual users, including user 102 and one or more merchants 130. For example, account information 128 may include identity information of user 102 and merchants 130, such as one or more full names, business names, street addresses, email addresses and phone numbers, website addresses, or other types of financial information, which may be used to facilitate online transactions between user 102 and merchants 130. Account information 128 or identity app 124 may also include device identifiers (e.g., unique device identifier present on the device, as described above, such as IMEI number) for user devices such as mobile device 104. Thus, identity app 124 may be configured to interact with a merchant server 132, a user 102, mobile device 104, or other payee to process, obtain, and store information for allowing quick payments.

FIG. 2 illustrates an example of a first time authentication flow, for example, for a user 102 with a service provider 120 in a method 200 for binding a user device in a mobile payment system such as system 100.

Figure 3A:
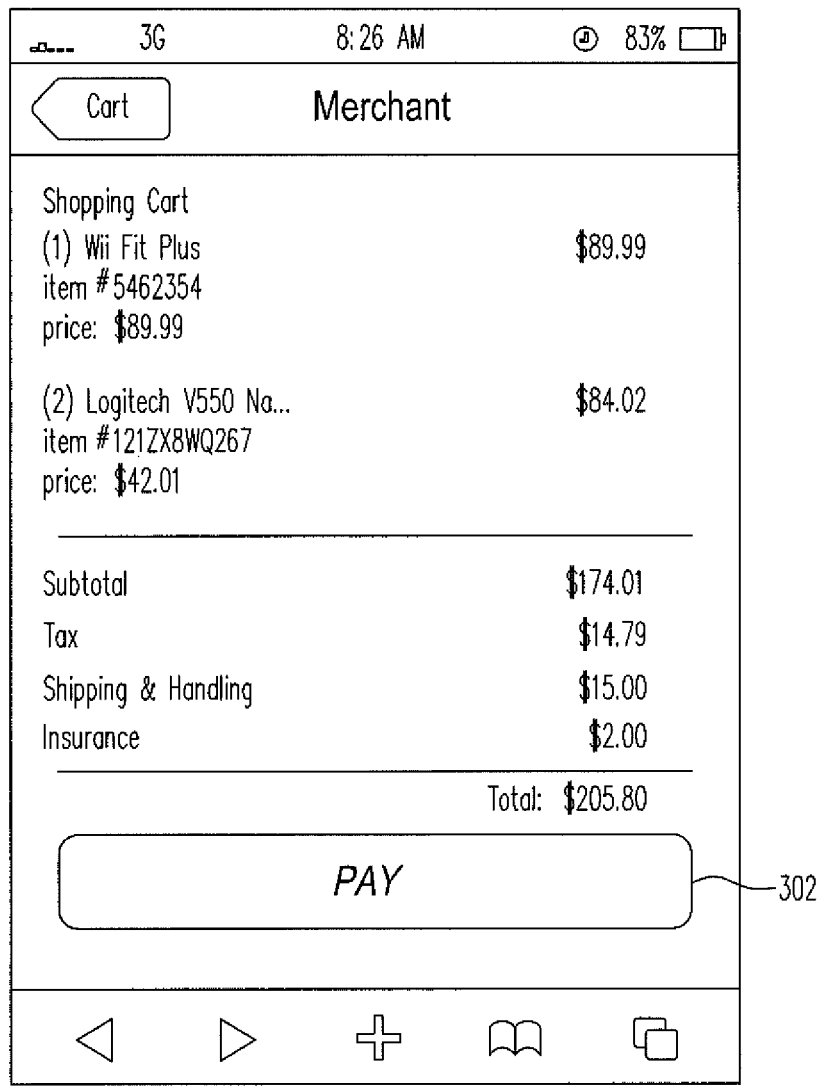
FIGS. 3A through 3E are sample user display screens illustrating transactions conducted in accordance with one or more embodiments.

At step 201, a user 102 may communicate over a network 106, using a mobile device 104, with a merchant 130, using the merchant's purchase app 134, for example, to browse the merchant's website and arrive at viewing a shopping cart page such as that shown in FIG. 3A. Tithe user clicks the pay button 302 in FIG. 3A, the user may be redirected to a page such as FIG. 3B, and method 200 may continue at step 202.

Figure 3B:
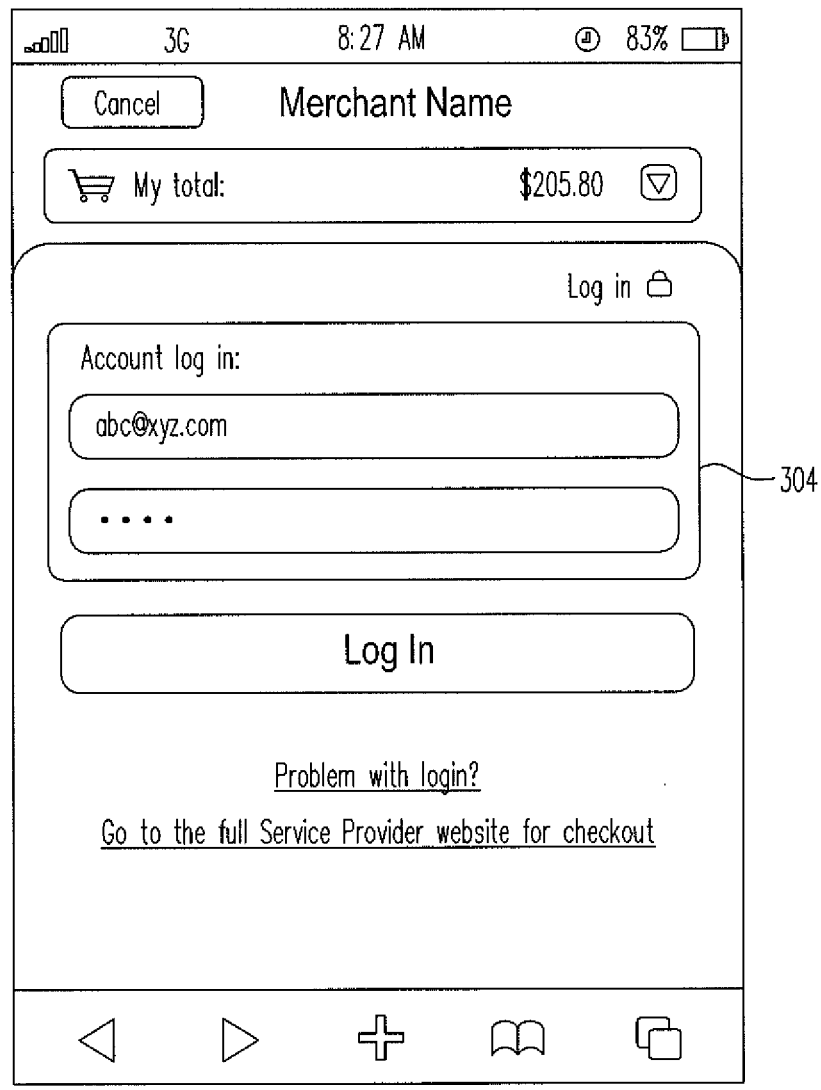
Figure 4:
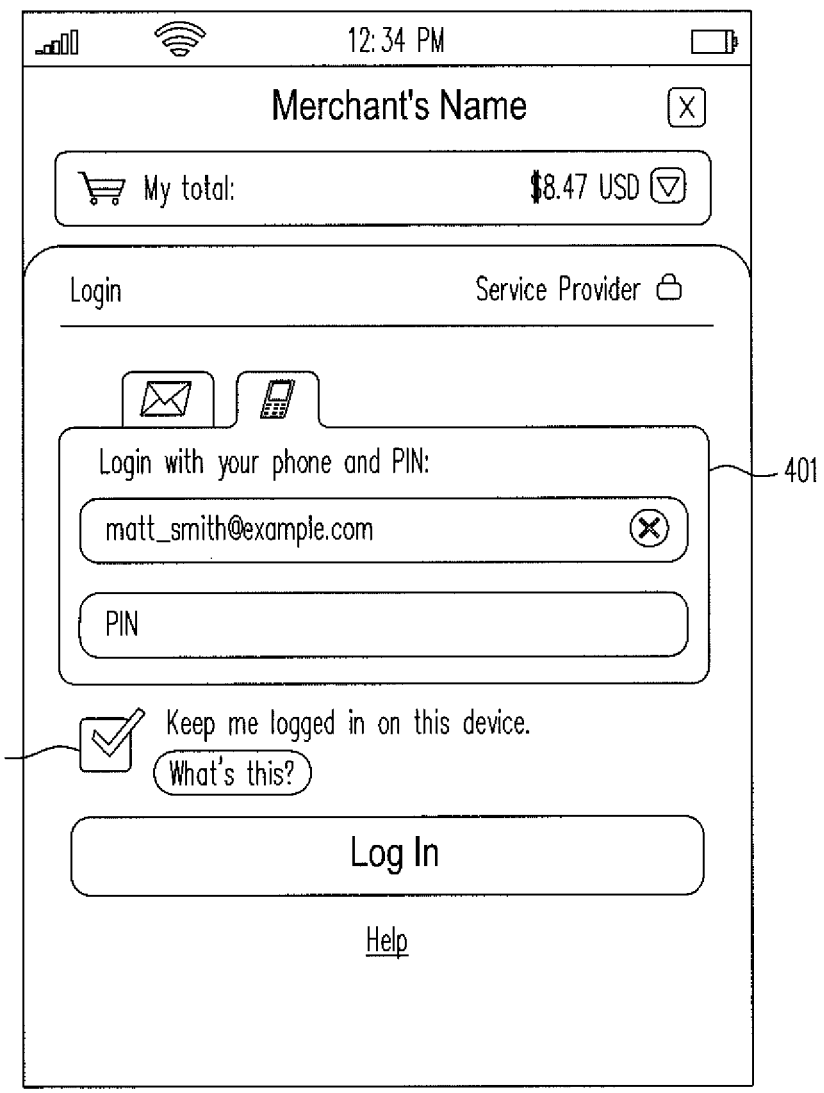
FIG. 4 is a sample user display screen illustrating a method for conducting transactions using device binding in accordance with one or more embodiments.

At step 202, user 102 may login to an account 128 belonging to or associated with user 102 by entering, for example, a username (e.g., email address) and a password in an account login dialog box 304 of a non-option login page, as shown at FIG. 3B. Alternatively, as shown at FIG. 4, user 102 may be presented at step 202 with a login page where user 102 may login to an account 128 belonging to or associated with user 102 by entering, for example, a username (e.g., phone number or email address as shown) and a personal identification number (PIN) in an account login dialog box 401 of a login page that provides an option, for example, using a checkbox 403, for the process flow to remember the user 102 (using, e.g., machine ID as described above). The login page shown in FIG. 4 may be referred to as an option login page in contradistinction to the non-option login page shown in FIG. 3B.

Figure 3C:
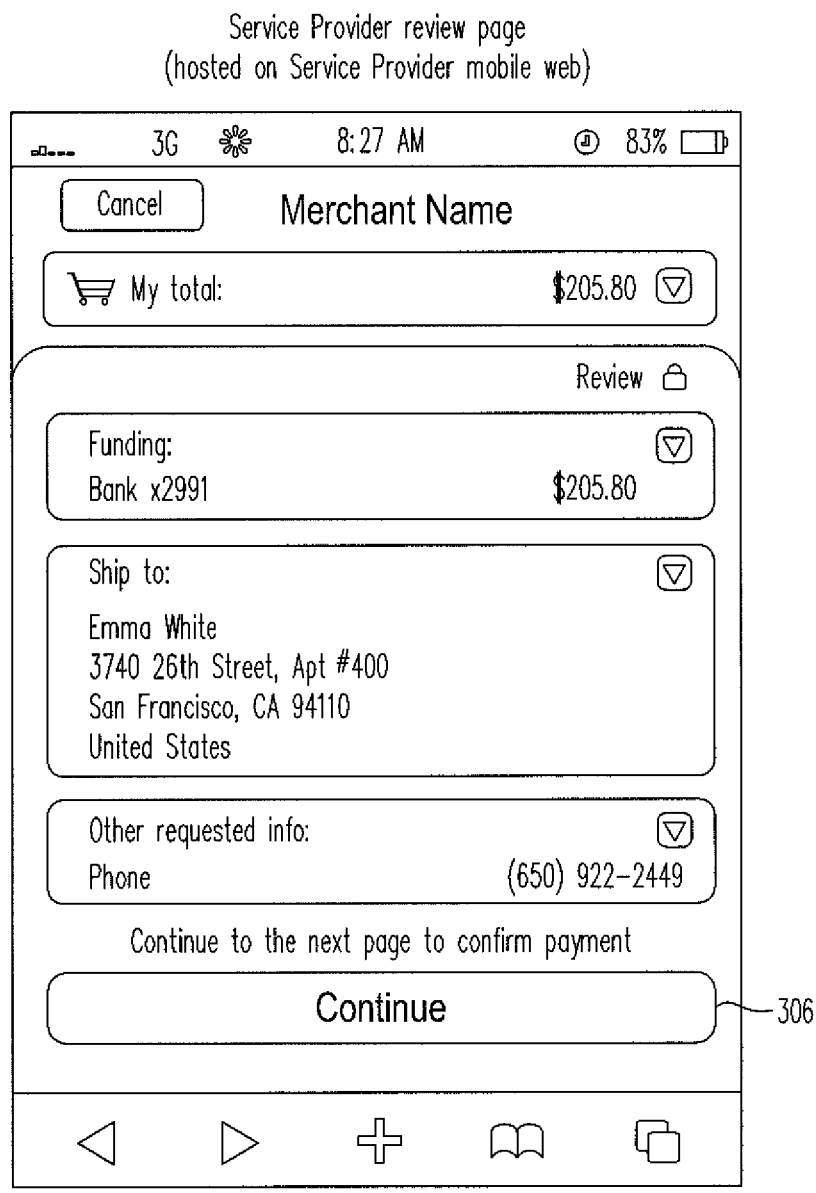
Figure 3D:
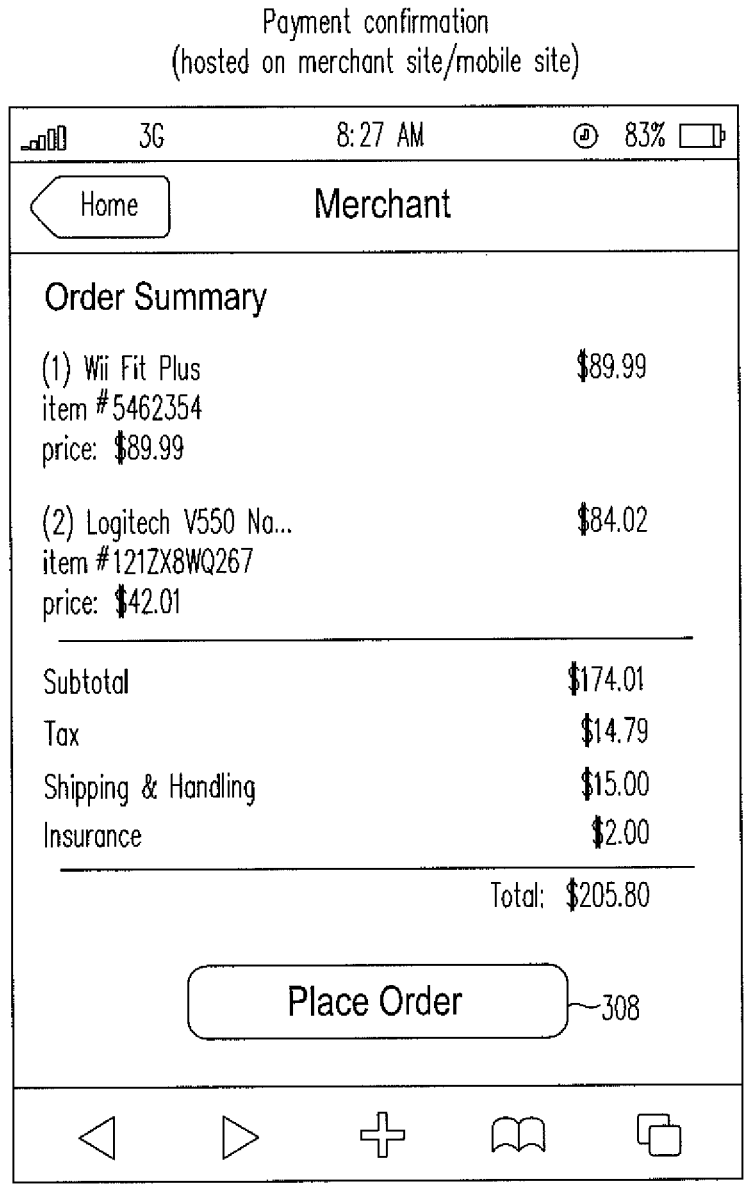

At step 203 of FIG. 2, user 102 may be presented—as shown, for example, at FIG. 3C—with a review page that allows the user to review and possibly change transaction or other information before committing to the transaction. If the user 102 clicks on the continue button 306, user 102 may be taken to a payment or other confirmation page such as that shown in FIG. 3D, for example. The confirmation page may provide the user 102 with a final opportunity to review or modify the transaction or information exchange, or user 102 may complete the transaction, for example, by clicking the place order button 308 shown in FIG. 3D. Upon completing the transaction, user 102 may be shown a final confirmation such as the payment complete page shown, for example, at FIG. 3E. Method 200 may then continue at decision block 204 shown in FIG. 2.

At step 204, if user 102 has at some point (e.g., at step 202 in FIG. 2 or step 212 in FIG. 2A) opted in, for example, by checking the check box on an option login page, such as checkbox 403 shown in FIG. 4, then the user's mobile device 104 has undergone binding to the user 102 and user's account information 128, and if the binding is still in effect the user can skip any further login process and may be returned to the merchant's app or another app running on device 104, so method 200 may continue at step 208 as shown in FIG. 2. Otherwise, method 200 may continue at step 205 as shown in FIG. 2.

At step 205, if the user has a PIN (e.g., the PIN may have been created previously at step 207) then any further login process may be abbreviated through use of the PIN. The user's PIN may provide enhanced security by being associated to the user's mobile device 104 along with the user's mobile device 104 having undergone binding (as described further below) yet at the same time provide extra convenience by avoiding a complete re-login when switching apps or website. If the user 102 has a PIN, user 102 may, for example, enter the PIN and method 200 may continue at step 208 as shown in FIG. 2, similar to the case (e.g., step 204) in which the user 102 has elected to be remembered but this case (step 205) may require PIN entry rather than being simply automatic.

If the user 102 does not have a PIN, method 200 may continue at step 206 as shown in FIG. 2. At step 206, user 102 may wish to have a username created (e.g., a phone number, email address, or other suitable identifier may be used) and to have a PIN created, typically a 4 to 6-digit number, and associated with the user's username. Creating the username and PIN may include associating the username and PIN to the user (e.g., user 102) and the user's account (e.g. account information 128).

If at step 206, the user (e.g., user 102) does not need a username or PIN or, for whatever reason, decides that he or she does not want to create either or both, step 207 may be skipped, and method 200 may continue at step 208 as shown in FIG. 2. Otherwise, the PIN (and a username if needed) may be created at step 207 and associated with the user (e.g., user 102) and the user's account (e.g. account information 128).

Figure 5:
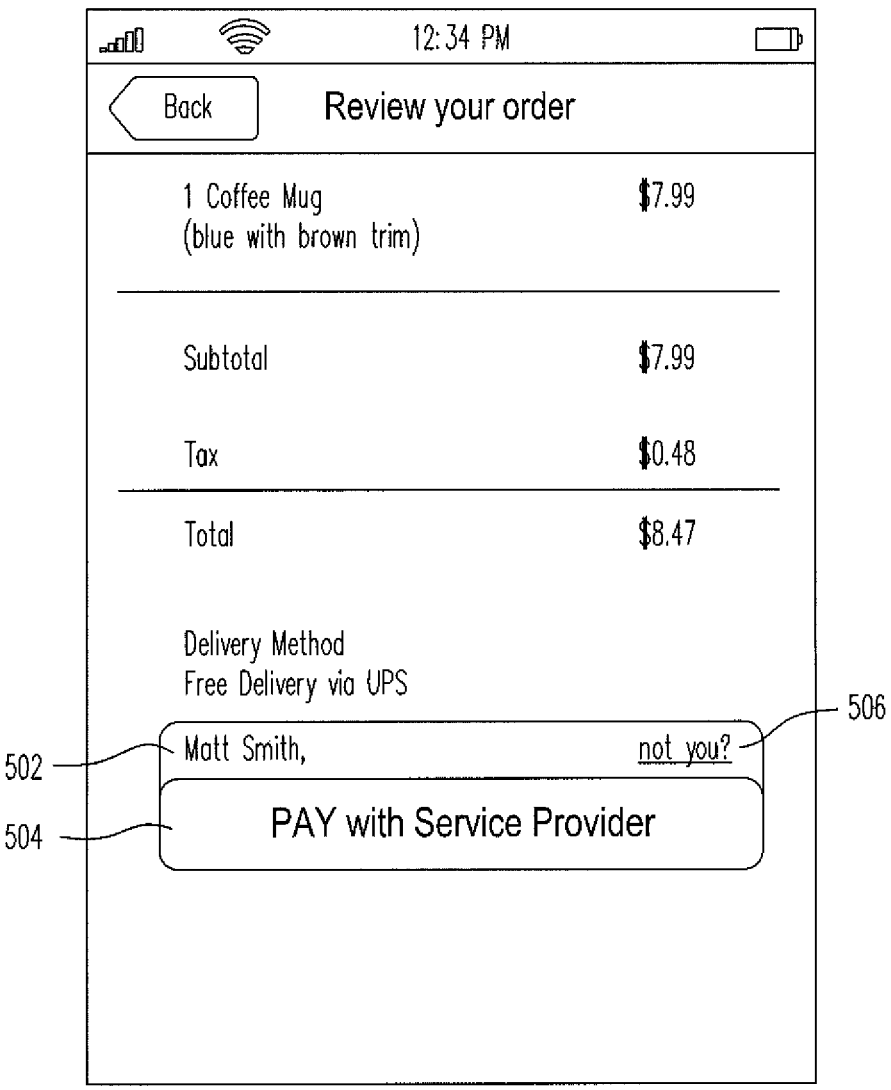
FIG. 5 is a sample user display screen illustrating a method for conducting transactions using device binding in accordance with one or more embodiments.

At step 208, if the user 102 has opted in, e.g., by checking "keep me logged in" check box 403 in FIG. 4, then any page displayed by the merchant's app (e.g., browser app 108 or other apps 110 on mobile device 104) to the user 102 may include personalized information (e.g., user name personalized information 502 shown in FIG. 5) to provide confidence to the user 102 that the app recognizes the user 102 and that user 102 is indeed still logged in. FIG. 5 shows, for example, a review page that provides a payment button 504 and personalized information 502 by which the user 102 may know that a payment is credited to the account associated with personalized information 502 when payment button 504 is clicked on or selected. FIG. 5 also shows that a "not you?" switch user button 506 may be provided. For example, if a phone is shared between family members, the switch user button may provide a convenient, fast way to reset the device binding or be redirected to a login page such as a quick PIN login page for abbreviated login using the other family member's PIN without having to go through a full login process.

FIG. 2A illustrates an example of a subsequent (after the first time) authentication flow, for example, for a user 102 with a service provider 120 in a method 200 for binding a user device in a mobile payment system such as system 100. At step 211, a user 102 may communicate over a network 106, using a mobile device 104, with a merchant 130, using the merchant's purchase app 134, for example, to browse the merchant's website and arrive at viewing a shopping cart page such as that shown in FIG. 3A. If the user clicks the pay button 302 in FIG. 3A, the user may be redirected to a page such as FIG. 3B, and method 200 may continue at step 212.

At step 212, although the user 102 has not opted in (e.g., there is no device binding in effect) the user 102 does have a PIN so user 102 may login to an account 128 belonging to or associated with user 102 by entering, for example, a PIN, as seen at FIG. 4. Method 200 may then continue at step 203 of FIG. 2, as shown in FIG. 2A. If the user 102 has, for example, forgotten the PIN or for any reason does not wish to use it, the user 102 may still use the "regular" user name and password login so method 200 provides the user 102 the alternative to continue at step 202 of FIG. 2, as shown in FIG. 2A.

FIG. 2B illustrates an example of a subsequent (after the first time) authentication flow, for example, for a user 102 with a service provider 120 in a method 200 for binding a user device in a mobile payment system such as system 100. At step 221, a user 102 may communicate over a network 106, using a mobile device 104, with a merchant 130, using the merchant's purchase app 134, for example, to browse the merchant's website and arrive at viewing a shopping cart page such as that shown in FIG. 3A. If the user clicks the pay button 302 in FIG. 3A, because the user has not opted in and does not have a PIN, method 200 may continue at step 202 (e.g., the "regular" user name and password login) of FIG. 2, as shown in FIG. 2B.

FIG. 2C illustrates an example of a subsequent (after the first time) authentication flow, for example, for a user 102 with a service provider 120 in a method 200 for binding a user device in a mobile payment system such as system 100. At step 231, a user 102 may communicate over a network 106, using a mobile device 104, with a merchant 130, using the merchant's purchase app 134, for example, to browse the merchant's website and arrive at viewing a shopping cart page such as that shown in FIG. 3A. If the user clicks the pay button 302 in FIG. 3A, because the user has opted in, method 200 may continue at step 203, skipping the login step of 202 to save the user time and provide convenience of not being required, for example, to re-enter a username and password. If, on the other hand the user 102 decides to log out, method 200 may continue at step 202 (e.g., the "regular" user name and password login) of FIG. 2, as shown in FIG. 2C, giving the user 102 the alternative to log back in again, if desired.

Returning to step 202, for example, of FIG. 2, if it is the first time (based on device interrogation, e.g., identity app 124 of service provider 120 polls mobile device 104) that a device 104 is connecting to the service provider 120, the service provider 120 may register the device 104 during its first authentication. Device 104 will not be associated with any account 128 or user 102 at this time. (This case is the same as if the previous owner (bound user) had removed the device from their account.) When authentication is happening, the service provider 120 may pass additional parameters for device binding. These parameters may be passed directly or as referenced in a token. The choice may differ on whether the device 104 is connecting to a web flow (e.g., EC, express checkout) or a pure API flow (e.g., MPL, mobile payment library). Examples of parameters for device binding from the service provider 120 mobile library include device information, such as device ID, device ID type (UDID) or IMEI, platform (e.g., Apple®, Android®), device name (e.g., Joe's iPhone®), device category (e.g., phone, computer), device model (e.g., iPod Touch®), operating system (OS) information, such as OS version and OS name, app information, such as app name (bundle display name), app ID (such as bundle ID used by Apple, Inc.), bundle name (different from above), and PayPal® x.com app ID. During authentication, the service provider 120 may not need to use a hash for subsequent authentication attempts because that can make logging in with a different account more problematic and may not work with two-factor authentication tokens.

When the user 102 has successfully logged in, the service provider 120 can associate the user's account 128 with the user device 104 which was previously registered. At that moment, the user 102 is bound to this device 104. A risk management analysis may be performed by the service provider 120 to determine whether the device can be registered to the account. For example, there might be a blacklisted account or device that should not be bound. If the device cannot be registered with that particular account, the service provider 120 can display an error message and not let the transaction be completed. The account database 126 can be updated to reflect the new registration of the device 104 to the account 128. The app 108 or 110 can also be added to that device 104 on that account 128. This may enable the service provider 120 to see which apps are being used on a particular user's device 104. Note that this does not imply that binding is happening at the app level. A device 104 may be registered regardless of what happens with the payment once authentication is completed. An email or other suitable notification can then be sent to the user 102

After registration, the payment flow may continue normally (as outlined above, for example, with reference to FIGS. 3A through 3E). The transaction or information exchange can be associated with a particular app (e.g., an app 110) on a particular device (e.g., device 104) so that the service provider 120 can run reports and make this information visible for administration conducted by the service provider 120.

Once the device 104 is registered, the service provider 120 can send an email or text to the user 102 (e.g., buyer) to let the user know what happened, what it means, and how the user can update it. The binding may happen before the payment is completed so the "your device is registered" email may come before the payment complete email. The registration email can also be sent even if the payment is not completed as long as the registration is completed during log in. The email can inform the user that the device is registered (e.g., the email may say what the device is and may show a picture). The user 102 can also be given information on how to remove (e.g., unregister) the device 104 or opt-in.

Returning to FIGS. 2A, 2B, and 2C, the following example illustrates a process for a subsequent authentication from the same user. Note that there could be cases where the service provider 120 allows multiple people to have the same device 104. If the next login on the device 104 is from same user as the first time, no further action is required for binding the device 104 to the account 128. The app name and app ID should be passed and stored in so they can be associated with the transaction and listed as an app that is being used by the device 104 (this information may be visible in the profile and in admin in database 126, for example, but may not be needed). Generally, the device 104 and app 108, 110 information may still be passed in as to associate the device and apps with a particular transaction.

There may be cases where a different user 102 may log in than was expected (someone who was not the currently active and registered user 102 on the device 104). In such a case, when a new account 128 (e.g., different user 102) successfully logs in, the service provider 120 may remove the device 104 as being actively associated with the previous account 128. Any preferences or settings on the device 104 may also be removed (when such preferences exist). The removal may free up the device 104 for the second user 102 to log in with the device 104 (assuming, for example, risk management of service provider 120 approves of the new relationship). In these cases, the process flow of method 200 may behave as it does for the first-time authentication (including any emails being sent to the new user 102). The removal may also enable the new user 102 to attach the new user's own preferences to the device 104 (when such preferences exist). Only the current user 102 may see their active device 104 in their profile; and the current user 102 should only see the apps the current user 102 has used since the device 104 was most recently activated on the user's own account.

The following provides a description according to one or more embodiments (e.g., with reference to one of steps 201, 208, 211, 221, or 231 of method 200 illustrated in FIGS. 2, 2A, 2B, and 2C) for a merchant 130 to use, e.g., to provide a quick pay feature on the merchant's site. Before beginning the checkout flow, merchant 130 may need to call an initialization function in a library (which may be included with other apps 138). Inputs may include the app ID and environment (e.g., sandbox or live) and return a reference token. Once the merchant 130 calls the library initialization function, the service provider 120 library can call a corresponding API to connect to the back-end service provider servers (e.g., server 122). Inputs may be an app ID and device-app-operating system information and return a reference token. The reference token mentioned above will then be used during the authentication to link the device 104 to the account (e.g., an account 128 that belongs to user 102) that logs in.

When the user 102 logs in, the device 104 may be bound to the account 128 if it was not already. The user 102 may use merchant apps to shop for items and navigate to a checkout flow. The merchant 130 may launch a Web-View session within an app 138 to render checkout flow on the merchant's mobile site. The user 102 may navigate to a screen or webpage with a service provider button (e.g., item details, shopping cart, payment methods).

The following is an example: User 1 is using Device 1 with App 1, App 2, and App 3. At this point, User 1's profile and administration (e.g., in database 126 of service provider 120) may show Device 1 with Apps 1, 2, and 3 as being active. User 2 then logs in with Device 1 on App 3. At this point, User 1 would no longer see Device 1 in their profile. However, an administration agent would see Device 1 listed on User 1's account (marked as disabled) and would see App 1, 2, and 3 marked as inactive. User 2 would see Device 1 in their profile with App 3 underneath it. An administration agent looking up User 2's account would see the same. User 1 then logs back in to Device 1 on App 1. User 1 would now see Device 1 in their profile, but they would only see App 1 listed below it. An administration agent looking up User 1's account, would see Device 1 as enabled. Underneath Device 1, the administration agent would see App 1 as active. The administration agent would also see App 2 and 3 as inactive. User 2 would not see Device 1 in their account profile. An administration agent may be able to see listings of current status.

A device 104 may be unbound or removed in several use cases, such as from a user profile, from administration, or when a second user logs in with the same device 104. When a device 104 is removed, it should no longer appear in the User 1's profile. It should still be associated with the User 1's account from a back-end model such that the information can be used by administration, risk management, or for reporting. The new status of device 104 (e.g., removed) should be reflected in the administration account for User 1. It should be available for another to account (User 2) to add. The service provider 120 may email the user 102 when a device is unbound (as this is not always done explicitly by the user but may be done by administration agent or risk rules, for example). This can also signal to the user 102 that the user's device is being used by someone else. This email can convey that the device 104 was removed from the account 128 so the user 102 can report any fraudulent activity (and, for example, get the device 104 listed as restricted). The next login on the device 104 may require a password authentication and can look like the first time through (e.g., step 202) to a user 102. If the device 104 is removed as a result of another user logging in during the checkout flow, the service provider 120 can still capture and use any opt-in preferences set during that login (just as if it were the first time through).

The service provider 120 may maintain a transaction history, such as which app 108, 110 and device 104 a payment was made from. This could be particularly important to help identify transactions made without user authentication. These details may be different for the buyer and seller. The buyer may want to see both the device 104 and app 108, 110 used. The seller may only see the app name.

Users may have the ability to manage settings, such as disable or enable an existing device 104 for staying logged in and view apps that have been used. Since the device binding can be at a device level or app level, users (e.g., user 102) do not need to be able to take action on these applications 108, 110, but they may want to know which apps have been used on their device 104. In embodiments where the device binding is at an app level, the users may take actions on the applications directly.

The service provider 120 may also have the ability to manage settings, such as updating tables so that administration agents can see the status of a device 104 on an account 128 as active (or other relevant term), maintain the ability for an administration agent to look up a device 104 or click on a device ID in the table of a user's devices, which can load up a list of accounts 128 that have been bound to the device 104. This list may include devices 104 that have been removed. The service provider 120 may identify which app 108, 110 was used and which device 104 was used for each mobile payment library (MPL) transaction.

During a device interrogation call (based on the current information passed in), the service provider 120 may decide what type of user-entered information will be required for authentication. In one embodiment, possible choices for user entry are a password or PIN via the merchant's app or nothing (e.g., quick pay). For devices 104 that are not registered, quick pay may not be used. The buyer may have to log in via a password or PIN the first time as described above. In the device interrogation call, the service provider 120 may not pass back any additional information about the user 102 that can be pre-filled since the service provider 120 has not seen the device 104 before or the device 104 has been removed from an account 128. The service provider 120 can also choose the channel in which the authentication should be done. For example, service provider 120 may choose if the authentication can be done from the native app (e.g. apps 110), or if it is required to be done via a browser (e.g., browser 108).

For devices 104 that are registered, the authentication type may be either quick pay or a PIN or password. The device interrogation calls may also need to pass back additional information that can be used for the login flow, which can include opt-in preference (so method 200 may know if box 403, for example, should be pre-checked), primary email address (to pre-fill email box), name (to display for quick pay), and phone number (to use for PIN login if a PIN exists on the account).

The choice for authentication can be influenced by whether the user 102 is eligible for quick pay and opted in and whether the user 102 who created a PIN will be eligible for PIN authentication in a merchant's app.

During any of the flows where the service provider 120 collects a password or PIN, the user 102 may be presented with the option (such as a check box like checkbox 403 shown in FIG. 4) to be remembered on the device 104. The option is not just limited to the first time device registration. A user 102 can opt-in during the PIN flow or when using the password flows. The option may be a device level preference (e.g., not an app level preference).

Certain emails can be sent when the user 102 opts-in during a purchase flow. If the device 104 was not yet registered, a registration email can include the user preference. If the device 104 was registered, and the preference was previously off, the user 102 may receive an email showing the current preference of user 102. If the device 104 was registered, and the preference was on, no email may need to be sent. This case can occur if a user 102 opted-in previously, but risk models indicated to the user 102 to enter a password on a future time of login. This case can also occur if the user 102 "logged out" then logged back in during a subsequent purchase.

Certain emails can be sent when the user 102 opts-out during a purchase flow. If a device 104 was not registered to this consumer (e.g., user 102), a registration or binding email can mention the user's preference. If a device 104 was already registered to this consumer (e.g., user 102), there may be no need to send another email.

Certain emails can be sent when the user 102 opts-out from the web or administration. If a preference is toggled via web or administration, an email can be sent to the user 102 as a confirmation.

In the situation where a password or PIN is required (e.g., step 202 or 212 of method 200), a login page (e.g., FIG. 3B or FIG. 4) may allow the user to enter the password or PIN. If the buyer (e.g., user 102) opted-in to quick pay, the user 102 may be returned to the merchant 130 without needing to enter credentials for the service provider 120. The merchant 130 can display any necessary success page (e.g., similar to FIG. 3E). If the buyer (e.g., user 102) opted-out of quick pay, then a determination may be made whether the buyer has a PIN on their account 128. If the buyer already has a PIN on their account, the buyer (e.g., user 102) may be returned to the merchant 130. The merchant 130 can display any necessary success page. If the user 102 does not have a PIN, then the user 102 may creates a PIN, e.g., as at step 207. A PIN creation page may allow the user 102 to create a phone-PIN combination. The combination may only be available for users in countries that support mobile PINs. This is an optional step, and the user 102 can go back to the app (e.g., app 110 or browser 108) if the user 102 does not want to create a PIN. After successfully creating a PIN, the user 102 may be informed and given a way to return to the merchant 130.

In the situation where no password or PIN is required (e.g., using quick pay), a merchant's page may displays the user's name (e.g., personalized information 502 as shown in FIG. 5) and an indication that the user 102 does not need to log in. Even with quick pay, a user 102 may be required to enter a password if the service provider 120 requests, such as with large payment requests or other risk triggers. The user 102 can then make the payment on the merchant page.

A user 102 may chose to "log out" before starting a payment flow. Once a user 102 logs out, the user 102 should be notified that the user 102 logged out. This may be done by taking the user 102 to the email-password page to log in with a different account 128. After a log out, the service provider 120 may not load the PIN-specific page if in the same flow. Instead, the next login should be a password login. In one embodiment, this can be handled on the client side. In another, it could be done on the server side as decided on by any business or risk logic. The settings of the device 104 can be updated such that any preferences to skip login are now turned off. The device 104 does not need to be removed from the account 128 as a result of this action. Instead, it can be removed when a subsequent user 102 logs into another account 128 with that device 104. This way the device 104 stays attached until it is used by someone else.

Once the user 102 navigates to checkout flow, the merchant app may make a call to initialize the service provider library, passing its application ID. Note that the merchant app can call the service provider library prior to checkout flow (either when merchant app is launched, or when merchant app launches a Web-View for checkout flow).

The following provides examples for situations where the checkout flow may be through the web (e.g., mobile express checkout using browser 108) as opposed to in the app (e.g., a native app 110 running on device 104).

The service provider 120 may perform device interrogation in the background (invisible to user 102) to extract device ID and other information and may respond with an initialization code. If the user 102 clicks on or otherwise selects the service provider button on the merchant's mobile website, the merchant back-office server (e.g., server 132) may make an API call with the parameters for the transaction including the return and cancel URLs (uniform resource locaters) to the service provider server 122.

Figure 3E:

The merchant mobile web site may show the user 102 a Payment Confirmation screen (e.g., similar to FIG. 3D) with final purchase, shipping, tax amounts, or a Payment Complete screen (e.g., similar to FIG. 3E). If the user 102 clicks "Complete order" on the Payment Confirmation screen, the merchant app may notify the merchant back-end server 132 to complete payment. Merchant back-end server 132 may make an API call to make a payment.

If a merchant 130 does not have a mobile web checkout flow already, the merchant 130 may still follow the flow above. However, the merchant 130 may open the Web-View directly to the redirect URL following the API call (including the initialization code). The merchant 130 may listen for the Return or Cancel URL to close out the Web-View session if the merchant 130 does not have a page to display. However, the merchant can still call the Get and Do calls as needed.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, micro-controller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system comprising:
  a computer processor of a service provider, for communicating over a network with a user device, wherein the computer processor executes a process for:
  binding the user device to a user account at an app level with a device-unique identifier unique to the user device by:
    associating, by the computer processor of the service provider, the user device and the user account with a first application running on the user device; and
    maintaining, by the computer processor of the service provider, a transaction history for identifying the first application and the associated user device and user account that a payment was made from; and
  maintaining a secure connection with the user device, based on the app level binding, including the transaction history, of the user device to the user account and the first application, when a user switches between the first application on the user device and a second application running on the user device and binding, at the app level, including maintaining a second transaction history for identifying the second application, the user device to the user account and the second application so that no login to the second application is required for the second application also to be associated with the user device and the user account, wherein: in response to receiving a user input not to opt in communicated from the user device over the network, the processor communicates an option to create a personal identification number (PIN) to the user device over the network.

2. The system of claim 1, wherein:
the processor interrogates the user device to determine a device identifier on the uses device that is uniquely associated with the user device.

3. The system of claim 1, wherein:
the processor registers the user device during a first authentication of the user device, using a unique identifier found on the user device.

4. The system of claim 1, wherein:
the processor binds the user device to the user account by associating the user account to the user device subsequent to the user device being registered.

5. The system of claim 1, wherein:
the processor binds the user device to the user account in response to receiving a user input to opt in communicated from the user device over the network.

6. The system of claim 1, wherein:
when the user device is bound to the user account and if the next login on the user device is from same user as the user associated with the user account, no further action is required for binding the user device to the user account.

7. The system of claim 1, wherein:
when the user device is bound to the user account and when a new account successfully logs in, the processor removes the user device as being actively associated with the user account and binds the user device to the new account.

8. A method comprising:
communicating, by a service provider, over a network with a user device;
binding the user device to a user account at an app level with a device-unique identifier unique to the user device by:
associating, by a service provider, the user device and the user account with a first application running on the user device; and
maintaining, by the service provider, a transaction history for identifying the first application and the associated user device and user account that a payment was made from; and
using the app level binding, including the transaction history, of the user device to the user account and the first application, to maintain a secure connection with the user device when a user switches between the first application on the user device and a second application running on the user device and binding, at the app level, including maintaining a second transaction history for identifying the second application, the user device to the user account and the second application so that no login to the second application is required for the second application also to be associated with the user device and the user account; and
in response to receiving a user input not to opt in communicated from the user device over the network, communicating an option to create a personal identification number (PIN) to the user device over the network.

9. The method of claim 8, further comprising:
registering the user device during a first authentication of the user device, using a unique identifier found on the user device.

10. The method of claim 8, further comprising:
once the device is registered, sending an email or text to the user device, with information that the device is registered.

11. The method of claim 8, further comprising:
binding the user device to the user account by associating the user account to the user device subsequent to the user device being registered.

12. The method of claim 8, further comprising:
binding the user device to the user account in response to receiving a user input to opt in communicated from the user device over the network.

13. A computer program product comprising a non-transitory computer readable medium having computer readable and executable code for instructing a processor to perform a method, the method comprising:
communicating, by a computer processor of a service provider, over a network with a user device;
binding the user device to a user account at an app level with a device-unique identifier unique to the user device by:
associating, by the computer processor of the service provider, the user device and the user account with a first application running on the user device; and
maintaining, by the computer processor of the service provider, a transaction history for identifying the first application and the associated user device and user account that a payment was made from; and
using the app level binding, including the transaction history, of the user device to the user account and the first application, to maintain a secure connection with the user device when a user switches between the first application on the user device and a second application on the user device and binding, at the app level, including maintaining a second transaction history for identifying the second application, the user device to the user account and the second application so that no login to the second application is required for the second application also to be associated with the user device and the user account; and
in response to receiving a user input not to opt in communicated from the user device over the network, communicating an option to create a personal identification number (PIN) to the user device over the network.

14. The computer program product of claim 13, wherein the method further comprises:
registering the user device during a first authentication of the user device, using a unique identifier found on the user device.

15. The computer program product of claim 13, wherein the method further comprises:
once the device is registered, sending an email or text to the user device, with information that the device is registered.

16. The computer program product of claim 13, wherein the method further comprises:
binding the user device to the user account by associating the user account to the user device subsequent to the user device being registered.

17. The computer program product of claim 13, wherein the method further comprises:
binding the user device to the user account in response to receiving a user input to opt in communicated from the user device over the network.

* * * * *

UNITED STATES PATENT AND TRADEMARK OFFICE
CERTIFICATE OF CORRECTION

PATENT NO. : 9,172,693 B2  
APPLICATION NO. : 13/294923  
DATED : October 27, 2015  
INVENTOR(S) : Kent Griffin et al.

Page 1 of 1

It is certified that error appears in the above-identified patent and that said Letters Patent is hereby corrected as shown below:

Claims

In column 15, line 3, claim 2:

Change the word "uses" to --"user"--

Signed and Sealed this  
Fifth Day of April, 2016

Michelle K. Lee  
*Director of the United States Patent and Trademark Office*